April 20, 1965  S. A. SCHERBATSKOY  3,179,801
STABILIZED SCINTILLATION DETECTOR SYSTEM WITH COMPARISON
LIGHT PULSES OF CONSTANT AMPLITUDE TO CONTROL
THE SENSITIVITY OF THE SYSTEM
Original Filed Sept. 23, 1958  2 Sheets-Sheet 2

Serge A. Scherbatskoy
INVENTOR.

BY Doris, McDougall
& Hersh

United States Patent Office 3,179,801
Patented Apr. 20, 1965

---

3,179,801
STABILIZED SCINTILLATION DETECTOR SYSTEM WITH COMPARISON LIGHT PULSES OF CONSTANT AMPLITUDE TO CONTROL THE SENSITIVITY OF THE SYSTEM
Serge A. Scherbatskoy, 804 Wright Bldg., Tulsa, Okla.
Original application Sept. 23, 1958, Ser. No. 762,890. Divided and this application Aug. 22, 1962, Ser. No. 218,719
2 Claims. (Cl. 250—71.5)

This invention relates to the detection and measurement of radiation, and more particularly to a scintillation counter for measuring the intensity and energy of such radiation as alpha, beta, gamma rays, neutrons, or any other radiations resulting from nuclear transmutations or disintegrations. This specification is a division of my copending application Serial No. 762,890, entitled "Stabilized Scintillation Detector," filed September 23, 1958, now abandoned.

As is well known, the detecting element of a scintillation counter consists of a suitably chosen material such as anthracene, cadmium tungstate, sodium iodide, cesium iodide, lithium iodide, commonly designated as "phosphor," that is adapted to scintillate, i.e., to convert the incoming radiation quanta such as gamma-ray photons or neutrons into light impulses. In traversing the phosphor the quantum to be detected loses its energy in exciting and ionizing the molecules of the phosphor. These molecules then radiate energy in the form of fluorescent light, some of which is collected on the photocathode of a photomultiplier tube.

It is extremely difficult to assure that a multiplier tube, even very carefully made to any specification, will be satisfactory and uniform in all its characteristics. The extreme sensitivity of the multiplier tube renders the apparatus liable to noises and drifts, the origin of which is uncertain. Furthermore, the characteristics of the multiplier are also often found to change with time, temperature, and exposure to radiation, supply voltage, and other factors. The "dark current" from the cathode also contributes to a variable background noise.

It is the purpose of my invention to compensate for changes in a photomultiplier tube apparatus and to provide an automatic controlling arrangement that will insure the stability of operation.

It is another purpose of my invention to compensate for changes in a multiplier tube and to provide an automatic controlling arrangement for varying the selectivity of an amplitude-selective network in response to the variation in sensitivity of the multiplier tube.

Other objects, together with some of the advantages to be derived in utilizing the present invention, will become apparent from the following detailed description taken together with the accompanying drawings in which.

Figure 1:
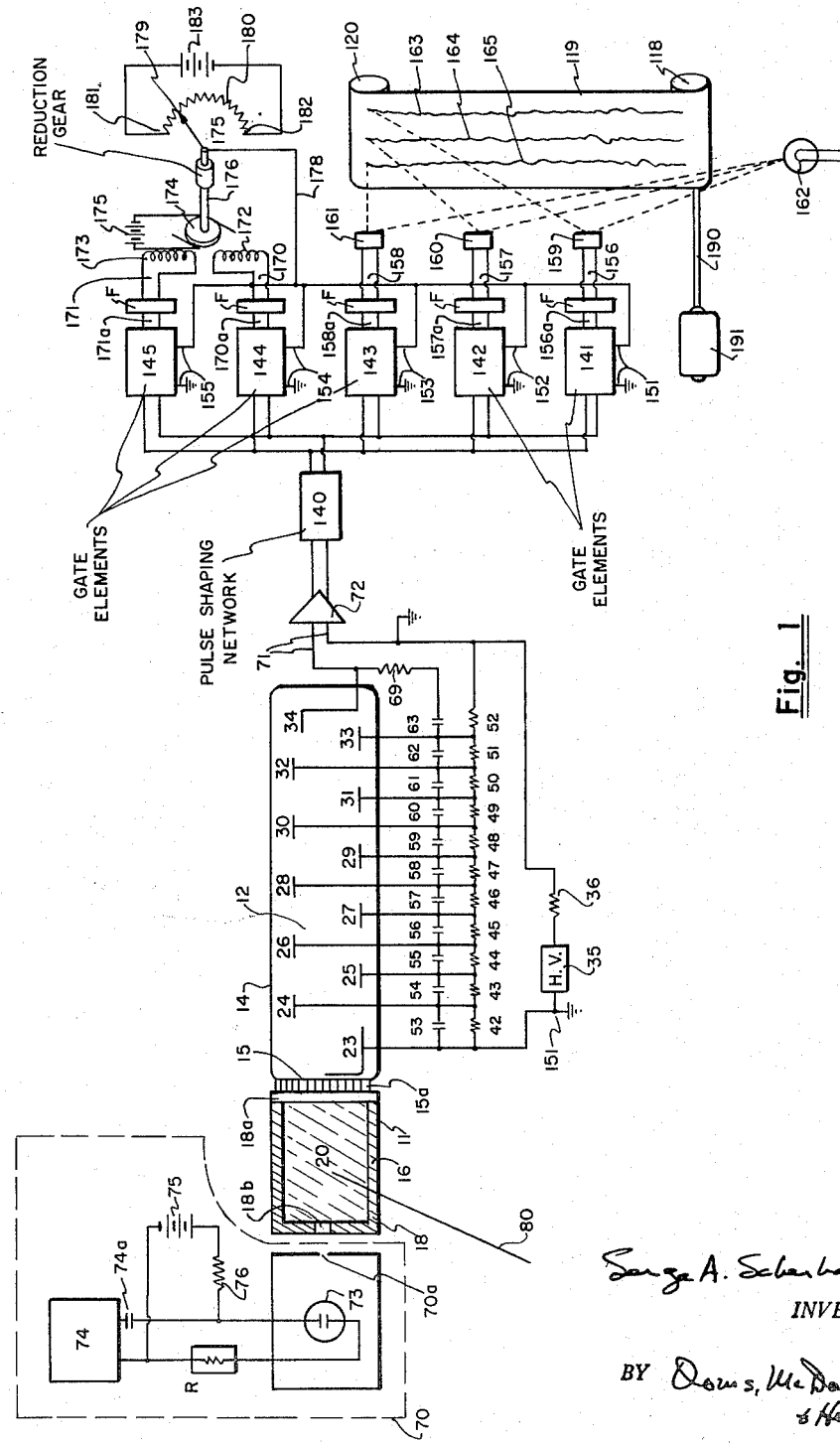
FIG. 1 illustrates an embodiment of my invention in which provision has been made for varying the selectivity of an amplitude-selective network in response to the variation in sensitivity of a photomultiplier.

An important feature of my invention is the provision of a system for continuously comparing the intensity of the light flashes generated in a scintillation counter to standard reference light pulses. In my invention the comparison is made automatically so that for all practical purposes variations in the instrument characteristics have little or no effect upon the measurement; the magnitude under study being continuously compared to a reference magnitude, said reference magnitude being produced by an electrically pulsed standard light source.

A feature of my invention is the provision of a system which generates reference light pulses which are easily distinguishable from the signal pulses. I have found that it is desirable to provide pulses which are larger than any of the signal pulses resulting from the nuclear radiation induced scintillations. Thus the reference pulses occupy a range of magnitudes which is unoccupied by other pulses and this of course makes it possible to pick up the reference pulses by very simple circuitry, as, for example, by a simple threshold device responsive to all pulses above a predetermined magnitude. Furthermore, I have found it very advantageous to have the pulses uniformly spaced and of relatively low and constant repetition rate. If the repetition rate is maintained rigorously constant, the development of a direct current representing the pulse magnitude is relatively easy since the problem of ripple filtration is minimized.

While various methods can be devised for calibrating a scintillation type radiation spectrometer, such as interpolating or extrapolating from the pulse magnitudes provided by nuclear radiation sources of known energy, such methods have important drawbacks. Monoenergitic radiation sources do not produce monomagnitude pulses since the interaction of nuclear radiation with matter is very complicated. There are photoelectric absorption, Compton scattering, pair formation, all of which interact with the radiation in a different manner and produce pulses of different characteristics resulting in a general "smear" which is well known and always been a serious handicap in nuclear spectroscopy, and for the same reasons it is also a handicap in calibration.

In my invention I have provided a pulsed light source, the light emission of which is controlled by electrical pulses. These electrical pulses give me a great freedom of choosing the magnitude, time of duration, and repetition rate, and I have found that by making the magnitude large and the repetition rate low a calibration signal can be provided which is easily picked up by the controlling mechanism and does not interfere at all with the signal pulses which are being analyzed by means of the pulse-height analyzer.

My invention is particularly concerned with nuclear spectroscopy and pulse-height analysis in which nuclear radiation causes a scintillating crystal or phosphor to emit light flashes, the magnitude and repetition rate of which measure the characteristics of the incoming radiation beam.

Referring now more particularly to FIG. 1, the arrangement shown therein comprises four essential elements: A phosphor included within housing 11, a photomultiplier 12, a source of reference light pulses 70, and an amplitude-selective network comprising three gates 141, 142, and 143 for selectively transmitting pulses within three separate ranges of magnitude. It is well known by those skilled in the art that the sensitivity of a photomultiplier such as the photomultiplier 12, is subject to drift variation and other uncontrollable changes. My invention consists in varying the selectivity of the amplitude-selective network comprising the gates 141, 142, and 143 in order to compensate for the variation in the sensitivity of the photomultiplier 12. This variation in selectivity is accomplished by means of a suitable controlling mechanism comprising the pilot light source 70 periodically emitting reference light flashes of constant intensity. These light flashes produce corresponding current pulses at the output terminal 71 of the photomultiplier 12 and the magnitudes of these pulses serve as an index of the sensitivity of the photomultiplier. Thus if the sensitivity of the photomultiplier 12 decreases, the pulses generated to the reference light flashes decrease in magnitude and conversely, if the sensitivity of the photomultiplier increases, the pulses generated by the reference light flashes increase in magnitude. The controlling mechanism for varying the selectivity of the amplitude-selective network is responsive to the increase or to the decrease of said pulses. Thus for instance, if the sensitivity of the photomultiplier decreases, the controlling mechanism shifts the amplitude-selective network so as to accept amplitudes of correspondingly lower values. Conversely, if the sensitivity of the photomultiplier increases, the controlling mechanism shifts the amplitude-selective networks so as to accept amplitudes of correspondingly higher values.

The photomultiplier 12 is of a standard construction within a cylindrical enclosure 14 provided with a transparent wall 15. The wall 15 is of a thin optical glass and is optically coupled to the phosphor member by means of a suitable substance such as silcone grease or Canada balsam 15a. The phosphor housing is placed adjacently the photomultiplier and has its inner walls coated with a light-diffusing substance 16. The phosphor member forms a unitary structure with outside walls 18 and two light-transparent glass windows 18a and 18b at each end, the windows being preferably of ultraviolet transparent glass such as Vicor. The phosphor element contained within the housing 11 consists of a suitable crystal 20, said crystal being, for example, anthracene, cadmium tungstate, sodium iodide, or lithium iodide.

The photomutliplier is provided with a photosensitive cathode 23 and a plurality of dynodes 24—33 and anode 34, each at a higher potential than the potential of the preceding one. The dynode potentials are derived from a voltage-dividing circuit consisting of a high voltage supply 35 in series with a resistor 36 and a plurality of resistor elements 42–52, said resistor elements being individually shunted by condensers 53–63, respectively. The voltage applied across the resistors 42–52 is approximately 1100 volts. Consequently, the voltage applied across each of said resistors is approximately 100 volts. The voltage across the resistor 42 is applied between the photocathode 23 and dynode 24, the voltage across the resistor 43 is applied across the dynodes 24, 25 and the voltages across the resistors 44, 45, 46, 47, 48, 49, 50, 51 are applied across the dynodes 25–26, 26–27, 27–28, 28–29, 29–30, 30–31, 31–32, 32–33, respectively. The voltage derived from the resistor 52 is applied across the electrodes 33–34 in series with the resistor 69. The output leads 71 connect the terminals of the resistor 69 to an amplifier 72 and the output terminals of the amplifier are in turn connected to the pulse-shaping network 140. For a description of a pulse-shaping network see J. W. Coltman and Fitz-Hugh Marshall, Nucleonics 1, 1947, p. 58.

The operation of the scintillation counter can be briefly explained as follows: Let numeral 80 designate a beam of incoming particles such as gamma-ray photons. The beam 80 is not monochromatic, i.e., it contains photons of various energy values. It is one of the purposes of this invention to investigate and to determine the energy spectrum of this incident beam 80, i.e., to investigate and to determine the composition of the beam. This can be expressed by the measurement of the relative rate of occurrence of photons comprised within several predetermined energy ranges. It is apparent that photons comprised in the beam 80 penetrate into the crystal 20 and interact with its electrons. As is well known, an electron is ejected as a result of such interaction, said electron losing its energy by exciting and ionizing the molecules in said crystal in the immediate neighborhood of the point of interaction. These molecules radiate energy in the form of light in all directions. These rays of light become reflected by the surface 16, then transmitted through the transparent walls 18a and 15 and the intervening material 15a to the photomultiplier 12 wherein they impinge upon the photocathode 23, thus forming a single pulse of photoelectrons. It is well known by those skilled in the art that the magnitude of said pulse of photoelectrons is uniquely related to the energy of the photon in the beam 80 that interacts with the crystal 20. When the incident photon has a relatively large energy then the corresponding electron resulting from the interaction with the crystal 20 also has a large energy and the pulse of photoelectrons formed at the photocathode 23 is relatively large.

It is thus apparent that we have in the beam 80 a succession of photons of various energies that interact with the crystal 20 and as a result of this interaction, we obtain at the photocathode 23 a succession of single pulses, each of said pulses having magnitude that is uniquely related to the energy of the corresponding photon in the beam 80.

Figure 1A:
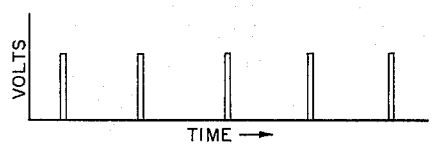
FIGS. 1a and 1b illustrate certain pulse shapes produced by part of the apparatus of FIG. 1.
Figure 1B:
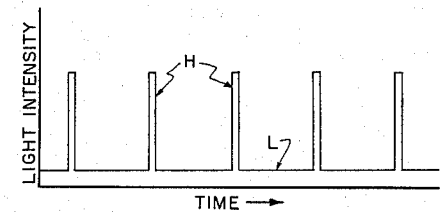

An important feature of the arrangement shown in FIG. 1 consists in the provision of a suitable light-emitting system 70 placed adjacently the phosphor 20, the purpose of said system being to periodically emit and to direct toward the cathode 23 reference light pulses of constant light intensity. More specifically, the system 70 comprises an argon light tube 73 having its terminals connected to a suitable source of pulsating current such as a multivibrator oscillator 74. Light tubes such as 73 are well known and, for example, are manufactured by the General Electric Company. It is desirable that the light flashes from the tube 73 be of very short duration. For this purpose it has been found convenient to keep the light tube 73 constantly ignited at a very low luminosity level by means of battery 75 and resistor 76 and to superpose on the weak current generated by said battery and resistor an additional voltage from a multivibrator 74 connected to the tube 73 through condenser 74a. The multivibrator 74 is of well-known standard construction such as the General Radio Co. Unit-pulser model Type 1217A, and is designed to generate an output voltage having a wave shape substantially as shown in FIG. 1a, i.e., a series of narrow pulses suitably spaced. The frequency of these pulses for the embodiment under discussion is preferably of the order of 20 pulses per second, and the width of the pulses is preferably of the order of 1 microsecond. The behavior of the entire element 70 is such as to put out light flashes substantially as shown in FIG. 1b, the lower constant illumination L being derived from the battery 75 and the resistor 76, and the high intensity flashes H being derived from the voltage generated by the multivibrator 74. By providing a suitable diaphragm or pin hole 70a the level of illumination L of FIG. 1b can be made entirely negligible, whereas the short flashes H are of substantial intensity and impinge on the photocathode 23. The amplitude of the pulses generated by the multivibrator 74 is substantially constant and the frequency of oscillation is relatively low, of the order of 20 pulses per second.

It is thus apparent that the photocathode 23 is subjected to light impulses derived from two different sources; first the light pulses due to the interaction of the incident nuclear radiation with the phosphor 20, and second light pulses due to the periodic energization of the argon tube 73. The reference pulses emitted by the tube 73 are preferably arranged to be of higher intensity than the pulses resulting from the interaction of the crystal 20 with the incident nuclear radiation. Both these pulses are subsequently amplified by the familiar secondary emission system of the multiplier tube comprising the photocathode 23 and the dynodes 24–33, each at a higher potential than the preceding one. Each photoelectron is swept to the first dynode by a potential difference of about a hundred volts and ejects four or five secondary electrons. These in turn are swept to the second dynode and similarly multiplied by the secondary emission amplification. After nine such stages, an avalanche of a million electrons, more or less, appears at the output of the photomultiplier tubes as a result of each initial photoelectron. We obtain then across the output terminals 71, a succession of current pulses. Some of these pulses of uniform and relatively large magnitude and occurring at equal intervals are due to the reference light flashes emitted by the tube 73. Other pulses of relatively smaller magnitudes that usually differ one from another are caused by the interaction of incident nuclear radiation (of the beam 80) with the phosphor 20.

Figure 2:
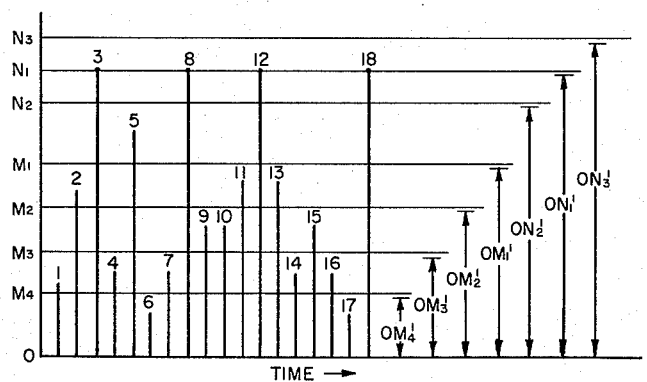
FIG. 2 illustrates diagrammatically a succession of current impulses obtained across the output terminals of the photomultiplier.
Figure 4:
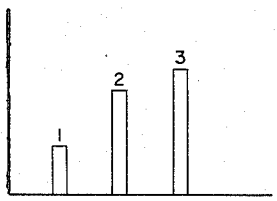
FIG. 4 shows diagrammatically the output of a pulse shaping network.

All the above pulses are subsequently amplified in the amplifier 72, said amplifier being connected to the pulse-shaping network 140 which is designed to provide for each pulse a corresponding output voltage pulse that will have a somewhat longer duration (and preferably a rectangular shape) and a variable height as shown in FIG. 4, said height representing the magnitude of the impulse. The output of said pulse-shaping network therefore consists of a succession of discrete pulses, the magnitude of each pulse serving to identify the energies of individual photons or quanta comprised in the beam 80 and the intensity of the reference pulses emitted by the tube 73. FIG. 2 gives a diagrammatical representation of such an output in which the abscissas represents the time of occurrence of the pulses and the ordinates represent the respective magnitudes of the pulses. The pulses have been designated by consecutive numerals such as 1, 2, 3, etc. These pulses have been subdivided into four energy groups which are designated by Roman numerals I, II, III, and IV.

Group I comprises pulses smaller than a predetermined value $OM_1$ and larger than a predetermined value $OM_2$. In FIG. 2 pulses belonging to this group are designated as 2, 11, and 13.

Group II comprises pulses smaller than a predetermined value $OM_2$ and larger than a predetermined value $OM_3$. In FIG. 2 the pulses belonging to this group are designated as 9, 10, and 15.

Group III comprises pulses smaller than a predetermined value $OM_3$ and larger than a predetermined value $OM_4$. In FIG. 2 the pulses belonging to this group are designated as 1, 4, 7, 14, and 16.

Group IV comprises pulses having all substantially a predetermined value $ON_1$. These pulses represent the intensity of the light flashes produced by the reference source 73. We have assumed that the light flashes produced by the source 73 occur at substantially equal intervals. In FIG. 2 the pulses belonging to this group are designated as 3, 8, 12, and 18. As shown in this figure, these pulses appear recurrently at substantially equal intervals.

The output pulses as shown in FIG. 2 are simultaneously applied to five gate elements designated in FIG. 1 by numerals 141, 142, 143, 144, and 145, respectively. Each gate element is characterized by two threshold values, i.e., it is arranged to transmit only those impulses the magnitude of which is below the upper threshold and above the lower threshold.

Thus the gate 141 has an upper threshold determined by the value $OM_1$ and a lower threshold determined by the value $OM_2$. Consequently, this gate 141 transmits only the impulses of the group I. The gate 142 has an upper threshold determined by the value $OM_2$ and a lower threshold determined by the value $OM_3$. Consequently, the gate 142 transmits only the impulses of the group II. The gate 143 has an upper threshold determined by the value $OM_3$ and a lower threshold determined by the value $OM_4$. Consequently, the gate 143 transmits only the impulses of the group III. The gate 144 is adapted to transmit signals having magnitude $ON_2$ somewhat smaller than $ON_1$, but cannot transmit signals having magnitude $ON_1$. Consequently, the upper threshold of the gate 144 is slightly above the value $ON_2$ but below the value $ON_1$, and the lower threshold is slightly below the value $ON_2$. The gate 145 is adapted to transmit signals having magnitude $ON_3$. Consequently, the lower threshold of the gate 145 is slightly below the value $ON_3$ but above the value $ON_1$ and the upper threshold is above the value $ON_3$.

The gates 141, 142, 143, 144, and 145 are provided with control terminals 151, 152, 153, 154, and 155, respectively, that receive corresponding control voltages.

The magnitude of the control voltage applied to the terminals 151 determines the value of the thresholds $OM_1$ and $OM_2$. By increasing (or decreasing) the control voltage the values of the thresholds $OM_1$ and $OM_2$ are increased (or decreased). However, the difference between the values $OM_1$ and $OM_2$ is maintained constant. Consequently the increase (or decrease) of the control voltages causes a shift of the transmitted band of magnitude upwards toward larger values (or downwards toward smaller values). However, the width of the transmitter band is maintained constant and independent of the variation in the control voltage.

Similarly, the magnitude of the control voltage applied to the terminals 152 (or the control voltage applied to the terminals 153) determined the threshold values $OM_2$, $OM_3$, or the threshold values $OM_3$ and $OM_4$ above or immediately below the value OC. By increasing or decreasing the control voltage applied to terminals 152 (or the control voltage applied to terminals 153) the threshold values $OM_2$, $OM_3$, or the threshold values $OM_3$, $OM_4$ are correspondingly increased or decreased. However, the difference between the thresholds $OM_2$, $OM_3$ or between the thresholds $OM_3$, $OM_4$ is maintained constant and independent of the variations in the control voltage.

The output terminals of the gate elements 141, 142, 143 are connected to conventional frequency meters F whose outputs are connected through leads 156, 157, 158 to galvanometer coils 159, 160, 161, respectively. These frequency meters are of conventional construction. (See, for example, Type SC–34 precision ratemeter manufactured by Tracerlab, Inc.) The galvanometer coils have attached thereto suitable mirrors in a manner well known to those skilled in the art and are adapted to reflect beams of light derived from a source 162, thereby effectively producing on the sensitive film 119 a record comprising three traces designated as 163, 164, 165, respectively, and representing the variations of the voltage applied to the galvanometer coils 159, 160, 161, respectively, as shown in the figure. We provide a shaft 190 driven by a motor or a suitable clock mechanism 191. Upon the shaft 190 is mounted a spool 118 for moving the photographic film from a feed spool 120 to the take-up spool 118.

It is thus apparent that the trace 163 represents the variation with time of the rate of incidence of photons or quanta within the energy group I and the traces 164 and 165 represent the corresponding variations of the rate of incidence of photons or quanta within the energy groups II and III, respectively.

In order to produce a satisfactory arrangement for producing traces such as those designated by 163, 164, and 165, consideration should be given to the variation in the amplification of the photomultiplier 12. As already stated, the characteristics of the photomultiplier usually are not stable. It is well known that the sensitivity and the amplification of the photomultiplier vary with the surrounding temperature and other ambient conditions, and are subject to drifts. This sensitivity or amplification is also subject to various erratic and uncontrollable changes and is very strongly dependent upon the magnitude of the supply voltage. Therefore, due to conditions beyond our control, the magnitude of impulses derived from the photomultiplier undergoes unpredictable changes. In order, therefore, to compensate for the variation in the sensitivity or amplification of the photomultiplier, I provide in the neighborhood of the photocathode 23 a source 73 of reference light pulses which, as explained hereinabove, may be a suitable argon tube energized at a reltaively low frequency by a multivibrator oscillator 74. Assume now that the photomultiplier is performing under normal operating conditions that are characterized by a certain known and predetermined sensitivity of the photomultiplier. Thus, there is a certain predetermined relation between the strength of an impulse of light striking the photocathode 23 and the corresponding current impulse appearing across the output terminals 71. Under these conditions the reference pulses of light emitted by the tube 73 and impinging upon the photocathode 23, cause an emission at the output terminals 71 of successive current impulses of uniform magnitude $ON_1$, as shown in FIG. 2. These impulses have been designated in FIG. 2 by numerals 3, 8, 12 and 18. These impulses cannot be transmitted through either of the gates 141, 142, 143. Furthermore, these impulses are too large to be transmitted through the gate 144 and too small to be transmitted through the gate 145.

Assume now that the sensitivity of the photomultiplier undergoes a change and assume further that the sensitivity decreases. Consequently, the current pulses across the output terminals 71 that are originated by the argon tube decrease in size and when they reach the magnitude $ON_2$ they pass through the gate 144 and produce a suitable voltage across the output terminals of said gate and across the leads 170. Assume now that the sensitivity of the photomultiplier increases. Consequently, the impulses caused by the argon tube increase in size and when they reach the magnitude $ON_3$ they pass through the gate 145 and produce a suitable voltage across the leads 171.

It is thus apparent that when the sensitivity of the photomultiplier decreases we obtain a voltage across the terminals 170 and when the sensitivity increases, we obtain a voltage across the terminals 171. The terminals 170, 171 are respectively applied to excitation windings 172, 173 of a D.-C. motor 174, said motor receiving its armature current supply from a battery 175. The windings 172, 173 are wound in such a manner as to produce two opposing magnetic fluxes. The motor 174 is adapted to displace angularly a rotatable conductive member 175a by means of a shaft 176. When the excitation winding 170 is energized by the voltage output from the gate 144, the member 175 effects an angular displacement in clockwise direction. When, however, the excitation winding 173 is energized by the voltage output from the gate 145, the member 175 effects an angular displacement in anticlockwise direction. One terminal 177 of the member 175 at the point of rotation is connected to a lead 178 and the other terminal 179 is slidingly engaged on a fixed semicircular resistor 180, said resistor having its two terminals 181, 182 connected to a battery 183.

It is apparent that the voltage between the grounded terminals 182 and lead 178 decreases when the member 175 rotates clockwise and increases when it rotates anticlockwise. This voltage is simultaneously transmitted to the control terminals 151, 152, 153, 154, and 155 of the gates 141, 142, 143, 144, and 145, respectively.

In order to understand the operation of the above-described compensating system, assume that the sensitivity of the photomultiplier decreases. The impulses corresponding to photons of the group I do not fall any longer within a range of magnitudes $OM_1$, $OM_2$ shown in FIG. 2. They fall within a lower range of magnitudes defined by limits $OM_1^1$ and $OM_2^1$ which are respectively below the corresponding limits $OM_1$ and $OM_2$ as shown in FIG. 2. Similarly, the impulses corresponding to gamma rays of group II and group III do not fall any more within magnitude ranges $OM_2$, $OM_3$ and $OM_3$, $OM_4$, respectively, but within lower ranges of magnitudes defined by limits $OM_2^1$, $OM_3^1$, and $OM_3^1$, $OM_4^1$, respectively.

It is therefore apparent that when the sensitivity of the photomultiplier is decreased, the gates 141, 142, 143 are not adapted any more to transmit impulses that are caused by photons belonging to the energy groups I, II, and III, respectively. It is therefore necessary to modify the transmitting characteristics of the gates 141, 142, and 143, so as to lower the bands of magnitudes from the positions $M_1$, $M_2$; $M_2$, $M_3$; and $M_3$, $M_4$ to the positions $M_1^1$, $M_2^1$; $M_2^1$, $M_3^1$; and $M_3^1$, $M_4^1$. This is effected by means of the control voltage appearing across the output terminals 170 of the gate 144 in the manner hereinabove described. Said control voltage causes the rotation of the shaft 175 in a clockwise direction. It is apparent that as the shaft 175 rotates, the control voltages applied to the terminals 151 to 155 decrease in magnitude and cause a progressive downward shift of the threshold values of the corresponding gates 141 to 145. In particular, the range of magnitudes transmitted through the gate 144 is not any more defined by the magnitude $ON_2$ but by a lower value. Consequently, the reference impulses caused by the argon tube 73 cannot pass any longer through the gate 144. Thus the voltage across the terminals 170 drops to zero and consequently the member 175 stops rotating and reaches a stationary position corresponding to a decrease in the control voltages to the terminals 151, 152, and 153 by a definite amount. This amount is such that the new thresholds corresponding to the gate 141 are not any more $OM_1$, $OM_2$ but $OM_1^1$, $OM_2^1$. The new thresholds corresponding to the gate 142 are not any more $OM_2$, $OM_3$ but $OM_2^1$, $OM_3^1$ and the new threshold values corresponding to the gate 143 are not any more $OM_3$, $OM_4$ but $OM_3^1$, $OM_4^1$.

It is thus apparent that when the sensitivity of the photomultiplier decreases the thresholds of the gates 141, 142, 143 adjust themselves automatically so that the gate 141 will accept all impulses originated by photons of the group I and the gates 142, 143 will accept all the impulses originated by gamma rays of the groups II and III, respectively. A similar automatic adjustment, but in the opposite direction, takes place when the sensitivity increases.

Figure 3:
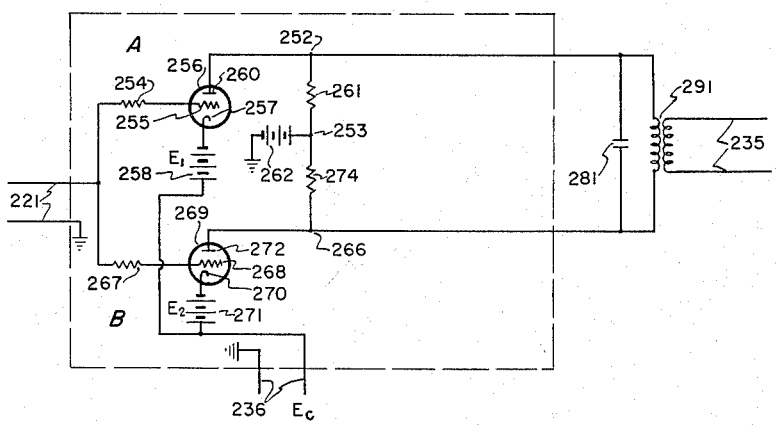
FIG. 3 shows schematically an electric circuit for transmitting impulses within a predetermined range of magnitude.

Consider now FIG. 3 showing in detail the schematic arrangement of a gate such as one of those designated by numerals 141–145 in FIG. 1. The gate has input terminals 221, output terminals 235 and control terminals 236. The control terminals 236 may be any of those designated by 151–155 in FIG. 1 and the output leads may be any of those designated by 156a, 157a, 158a, 170a, 171a in FIG. 1.

The essential element of the gate consists of a pulse-height selector comprising two individual channels designated as A and B. The pulse-height selector channel is arranged to give across its output terminals a voltage pulse only when the input pulse applied to terminals 221 is contained within a predetermined range of magnitudes constituting the transmission band. This range of magnitudes is determined by the control voltage applied to the terminals 236. That is, with a certain value for the control voltage the circuit will pass only input voltage pulses within a predetermined band of magnitudes. If the input voltage pulses are outside the band no output will be produced.

Assume now that $n$ impulses having magnitudes within the transmission band enter at the input terminals 221. These impulses produce across the terminals 252, 266 $n$ voltage impulses, each of said voltage impulses having a very short duration. The channel A comprises input terminals 221, resistor 254, and triode 256, whose cathode 257 is connected in series with biasing battery 258 to the control voltage applied to the control terminals 236. The plate 260 of this triode is connected to the output terminal 252 and to resistor 261 which in turn is connected to the battery 262.

The channel B comprises input terminals 221, resistor 267, and triode 269, whose cathode 270 is connected in series with biasing battery 271 to the control voltage applied to the control terminals 236. The plate 272 of the triode 269 is connected to the output terminal 266 and to resistor 274 which in turn is connected to battery 262 and then to ground.

In reference now to channel A, it is apparent that we obtain at the output terminals 252, 253 only those input pulses that are capable of overcoming the biasing voltage of the tube 256. Assume that the voltage of the battery 258 is $E_1$ and that the voltage applied to the control terminals 236 is $E_c$. Then the total biasing voltage for tube 256 is $E_1+E_c$. Therefore, only the impulses that are capable of exceeding the threshold value provided by the total biasing voltage are transmitted through the channel A and appear across the output terminals 252, 253.

Similarly, in the channel B only those input pulses appear across the output terminals 266, 253 that are capable of overcoming the total biasing voltage of the tube 269. Assume that the voltage of the battery 271 is $E_2$. Then the total biasing voltage of the tube 269 is $E_2+E_c$. Consequently, only those impulses that are capable of exceeding the threshold value determined by $E_2+E_c$ cause pulses to appear across the terminals 266, 253.

The two output voltages across the terminals 252, 253 and 266, 253 are in opposition, so that the resultant output between the terminals 252, 266 is equal to their difference. Consider now three cases designated as $(a)$, $(b)$, and $(c)$.

*Case a:*—The impulse applied to the terminals 221 has a value below the threshold voltages of the tubes 256 and 269. Consequently, no plate currents will be delivered by these tubes and no voltage will appear across the terminals 252, 266.

*Case b:*—The impulse applied to the terminals 221 has a value above the threshold voltages of the tubes 256 and 269. Consequently, both tubes deliver plate currents, and two short voltage impulses appear substantially simultaneously across the output terminals 252, 253 and 266, 253. Since these two voltages are substantially equal, the resultant voltage across the terminals 252, 266 is substantially zero.

*Case c:*—The pulse applied to the terminals 221 has a value smaller than the threshold of the tube 269, but larger than the threshold of the tube 256. Consequently a plate current will pass through the tube 256 and no plate current will pass through the tube 269. Consequently, no voltage will be produced across the terminals 266, 253 and a short voltage impulse will appear across the terminals 252, 253. We obtain, therefore, across the terminals 266, 252, a voltage pulse. It is thus apparent that only those pulses that are comprised within the range determined by the value $E_1+E_c$ and $E_2+E_c$ produce corresponding output impulses across the terminals 266, 252.

The output impulses derived from terminals 266, 252 are applied to a transformer 291, the secondary of which is connected to leads 235 which represent the leads 171a or 170a or 158a or 157a or 156a in FIG. 1. As shown in FIG. 1, these leads are connected to the input terminals of frequency meters. Again referring to FIG. 1, consequently we obtain across the output terminals of the respective frequency meters a D.-C. voltage representing the rate of occurrence of the pulses passed by the respective pulse-height selectors.

If we refer now to the gate 141 of FIG. 1 at normal operating condition, then the value $E_2+E_c$ determines the upper threshold, the value $E_1+E_c$ determines the lower threshold. If the sensitivity of the photomultiplier decreases then the control voltage applied to the terminals 141 decreases by an amount $\Delta E_c$ and assumes a new $E_c-\Delta E_c$. Then the upper threshold assumes a new value corresponding to $E_2+E_c-\Delta E_c$ and the lower threshold assumes a new value corresponding to $E_1+E_c-\Delta E_c$. It is apparent that the width of the transmitted band is determined by $E_2-E_1$ and is substantially independent of the value of the control voltage. When the control voltage increases, the pass band is shifted upwards; when the control voltage decreases, the pass band is shifted downwards.

Similar relationships hold for all the remaining gates 142–145. It should be noted that under normal conditions the gates 143, 144, 145 admit very narrow bands comprising the magnitudes $OC_1$, $OD_1$, and $OD_2$, respectively. Thus in case of the gate 143 the value $E_2+E_c$ determines a value slightly over OC, the value $E_1+E_c$ determines a value slightly below OC.

The precision of operation of my invention can sometimes be improved by small refinements such as the use of non-linear resistor R, as shown in FIG. 1. This resistor in series with the multivibrator 74 and the light bulb 73 has a stabilizing effect because it is so designed that its resistance value increases whenever the current tends to increase, thus stabilizing the current through the tube 73. The non-linear resistor R can be made of thyrite, copper oxide, or may be a backward-connected silicon diode, as is well known. I have also found that in some cases good results can be obtained by pulsing the light source 73 by means of a light commutator. Such commutation is well known and may be accomplished by conventional means such as a Kerr cell and multivibrator, or rotating mirror or rotating slits.

While I have described my invention in connection with certain specified embodiments thereof, it is to be understood that this is by way of illustration and not by way of limitation, and the scope of my invention is to be determined primarily by reference to the appended claims.

I claim:

1. In a radiation detecting system for selectively detecting incident radiation within a determined energy range, having a scintillating phosphor adapted to produce scintillations in response to interaction with said radiation, the intensity of said scintillations being related to the energy of said radiation, a photoelectric device selectively responsive to scintillations within a determined range of intensities for producing first electric current pulses corresponding to said scintillations, and means for controlling the selectivity of said photoelectric device, the combination which comprises a standard electric light source, means for feeding electrical energy to said source in current pulses of predetermined magnitude, thereby producing from said light source corresponding light pulses of predetermined uniform intensity, said light source being positioned to cause said light pulses to impinge upon said photoelectric device and thereby to produce second current pulses, and means fed by said second pulses and operatively connected to said controlling means, for regulating the selectivity of said photoelectric system responsively to changes in a physical characteristic of said second pulses.

2. In combination with a photoelectric system selectively responsive to incident photons comprised within a determined energy range and operative to produce first electric current pulses corresponding to said photons, means for controlling the selectivity of said device, a standard electric light source, means for feeding electrical energy to said source in current pulses of predetermined magnitude, thereby producing reference photons of determined uniform energy above said aforementioned energy range, said source being positioned to cause said reference photons to impinge upon said photoelectric device and thereby to produce second current pulses, and means fed by said second current pulses and operatively connected with said controlling means, for regulating the selectivity of said photoelectric device responsively to changes in a physical characteristic of said second pulses.

References Cited by the Examiner

UNITED STATES PATENTS

| | | | |
|---|---|---|---|
| 2,198,233 | 4/40 | Snyder | 250—207 |
| 2,412,423 | 12/46 | Rajchman | 250—207 |
| 2,648,012 | 8/53 | Scherbatskoy | 250—71.5 |
| 2,957,988 | 10/53 | Fearnside | 250—71.5 |
| 3,056,885 | 10/62 | Scherbatskoy | 250—71.5 |

RALPH G. NILSON, *Primary Examiner.*

JAMES W. LAWRENCE, *Examiner.*